United States Patent [19]
Noero

[11] Patent Number: 5,863,442
[45] Date of Patent: Jan. 26, 1999

[54] PROCESS FOR PROCESSING SPENT PHOTOGRAPHIC BATHS

[76] Inventor: Roger Noero, Graf-Eberstein-Str. 6, D-76199 Karlsruhe, Germany

[21] Appl. No.: 857,203

[22] Filed: May 15, 1997

[30] Foreign Application Priority Data

May 16, 1996 [DE] Germany ................. 196 19 827.5

[51] Int. Cl.$^6$ ........................................ C02F 1/20
[52] U.S. Cl. .................... 210/718; 210/721; 210/724; 210/726; 210/759; 210/767
[58] Field of Search .................. 210/718, 721, 210/724, 726, 759, 767; 75/713

[56] References Cited

U.S. PATENT DOCUMENTS

| | | | |
|---|---|---|---|
| 3,829,549 | 8/1974 | Anderson et al. ................. | 210/721 |
| 4,755,453 | 7/1988 | Kunda et al. . | |
| 4,874,530 | 10/1989 | Kobayashi . | |
| 5,085,836 | 2/1992 | Booker . | |
| 5,160,417 | 11/1992 | Neale .................................. | 210/702 |

FOREIGN PATENT DOCUMENTS 0434107  6/1991  European Pat. Off. .

OTHER PUBLICATIONS

WPI Database section Ch, week 9527, Derwent Publications Ltd. Class D15 An 9 XP002036614 & JP 07 116 670 Ko Eng KK May 9, 1995.

WPI Database section CH, week 7626, Derwent Publications Ltd Class D15 AN 76–48533X XP002036615 & JP 51 052 666 (S. Inoue) May 10, 1976.

*Primary Examiner*—Jay H. Woo
*Assistant Examiner*—Betsey J. Morrison
*Attorney, Agent, or Firm*—Antonelli, Terry, Stout & Kraus, LLP

[57] ABSTRACT

A process for the processing of spent photographic baths of black and white processes, namely developing baths with a preponderant content of alkali sulphite, particularly sodium sulphite, and fixing baths with a preponderant content of thiosulphates, particularly ammonium thiosulphate and/or sodium thiosulphate is proposed and is characterized in that following the deposition of the silver contained in the baths, the spent fixing baths are brought to a pH of approximately 0.5 with concentrated HCl and the elementary sulphur resulting from the decomposition of the thiosulphates is separated, whilst the remaining sulphurous acid intermediate solution is mixed with the spent developing baths and adjusted to a pH of approximately 2 and the resulting, $SO_2$-supersaturated solution is heated and pure $SO_2$ is drawn off in a vacuum. Finally, the residual solution is adjusted to a pH of approximately 10 with $Ca(OH)_2$ and the liberated ammonia is drawn off.

5 Claims, No Drawings

PROCESS FOR PROCESSING SPENT PHOTOGRAPHIC BATHS

FIELD OF THE INVENTION

The invention relates to a process for processing or working up spent or exhausted photographic baths from black and white processes, namely developing baths with a preponderant proportion of alkali sulphite, particularly sodium sulphite, and fixing baths with a preponderant content of thiosulphates, particularly ammonium thiosulphate and/or sodium thiosulphate.

BACKGROUND OF THE INVENTION

Developing baths and fixing baths are used in large quantities for the development of black and white photographs. Nowadays developing baths preponderantly contain sodium sulphite as the oxygen acceptor, together with hydroquinone, potassium bromide, carbonates, borates or phosphates and sodium hydroxide as the basic component. Fixing baths contain as the main component thiosulphates generally in the form of up to 90% ammonium sulphate and 10% sodium thiosulphate, as well as sulphites and bromides and optionally potassium alum and usually acetic acid as the acid component.

Apart from unusable excesses of the aforementioned components, spent baths contain complex-bound silver ions, water-soluble constituents from the photographic material, such as colloids from emulsion and protective layers, platicizers, etc. According to modern environmental protection regulations these waste baths constitute hazardous waste, which must be disposed of or processed in accordance with the legal requirements, so as to be dischargeable into the standard waste cycle.

It has long been known to recover the most valuable component of spent baths, namely the silver contained therein. This take place by the electrodeposition of the metal or by precipitation using hydrogen peroxide. The desilvered baths can be further processed by oxidation and precipitation reactions (DE 33 37 215 A1) in that fixing and developing solution are mixed and hydrogen peroxide added. The sulphides, sulphites and thiosulphates are transformed into alkali sulphates and then milk of lime is used as the precipitant. As a result large calcium sulphate (gypsum) quantities are obtained. Even larger gypsum quantities are now obtained during purification and cleaning processes for acid media (flue gases, waste water, etc.) by adding milk of lime. These large process gypsum quantities are scarcely economically usable, because the degree of purity is unsatisfactory for many applications.

It is also known to distil in a vacuum the spent, desilvered baths. Mainly the salt concentration is raised and the hazardous waste volume reduced by approximately 20 to 30%. The water condensate obtained still contains too many impurities from the photographic baths to allow introduction into the waste water system. The further purification using ion exchangers or reverse osmosis is complicated and therefore uneconomic.

The combustion of spent photographic chemicals by feeding into waste incineration plants leads to a rise in the $SO_2$ content of the flue gases and therefore to an additional burden of the flue gas desulphurization plant, as well as the gypsum budget.

The electrodialytic regeneration of photographic baths (DE 30 22 305 A1, DE 30 22 328 A1) leads to the recovery of silver ions. In addition, salts are obtained, which have not been used in practice in the preparation of new baths. In addition, the constituents of the thus processed solution must be supplemented.

It is finally known (DE 34 40 894 A1) to process photographic chemicals with considerable technical effort, particularly the use of energy and chemicals, leading to distilled water, an approximately 10% ammonia solution, calcium sulphate and ammonium/sodium thiosulphate. There is an approximately 50% thiosulphate recovery, but cannot be used again in photographic baths due to its impurities. The recovered ammonia solution quantities are also economically insignificant. Once again large quantities of gypsum and contaminated water condensate are produced.

The problem of the invention is to process the developing and fixing baths used in black and white processes in a single, multistage process to novel substances in an environmentally compatible manner.

SUMMARY OF THE INVENTION

According to the invention this problem is solved in that following the deposition of the silver contained in the baths, the spent fixing baths are brought with concentrated HCl to a pH of approximately 0.5 and the elementary sulphur resulting from the decomposition of the thiosulphates is separated, whilst the remaining sulphurous acid intermediate solution is mixed with the spent development baths and set to a pH of approximately 2 and the resulting $SO_2$-supersaturated solution is heated and pure $SO_2$ is drawn off in a vacuum, the remaining $SO_2$-free residual solution being adjusted to a pH of approximately 10 with $Ga(OH)_2$ and the ammonia released is drawn off.

In the new state, fixing solutions for black and white development contain approximately 200 g of thiosulphate and 20 g of sulphite per liter. Developing solutions contain up to 100 g of sulphite per liter. One liter of spent fixing solution still contains about 120 to 150 g of thiosulphate and 10 to 15 g of sulphate. In spent developing solutions there are approximately 40 to 50 g of sulphite per liter.

In the case of the inventive processing of fixing baths by adding concentrated hydrochloric acid from 1000 g of ammonium thiosulphate are obtained approximately 200 to 210 g of elementary sulphur and 550 g of sulphite ($SO_3^{--}$). The resulting $SO_3^{--}$ can be drawn off in a vacuum and 400 g of pure $SO_2$ are obtained. The recovery of the sulphur is most easily carried out by sedimentation. It is recommended that the solution be allowed to settle for approximately 12 hours. If the recovered sulphur is converted into $SO_2$ by combustion, the $SO_2$ yield is increased by approximately 400 g. Thus, approximately 840 g of $SO_2$ are obtained from 1000 g of thiosulphate.

In the second stage spent developing solution, whose basicity leads to a rise in the pH-value is added to the sulphurous acid intermediate solution. The pH-value should be set at approximately 2. As a result the sulphites contained in the developing solutions are also transformed into $SO_2$. The $SO_2$ supersaturated solution from both process stages is then advantageously heated and the $SO_2$ drawn off in a vacuum, because it can be almost completely recovered.

The $SO_2$ obtained with the process according to the invention has a high purity level. Without difficulty at approximately 2 bar it can be condensed to liquid $SO_2$ or by introduction into water transformed into sulphurous acid with a very high degree of purity. It is also possible to prepare alkali hydrogen sulphites in aqueous solution or suspension.

In the final stage the $SO_2$-free residual solution is adjusted to pH 10 with calcium hydroxide and the liberated ammonia is drawn off in a vacuum. Approximately 240 g of $NH_4^+$ are obtained from 1000 g of ammonium thiosulphate. It can be further used in gaseous form or as ammonia solution or converted into utilizable ammonium salts by introduction into acid solutions. After drawing off the ammonia the pH-value is set at approximately 8.5.

The residual liquid obtained in the process according to the invention generally still contains small amounts of sulphite and organic substances. Thus, the residual liquid is mixed with $H_2O_2$ for oxidizing the remaining constituents. Generally small hydrogen peroxide quantities are sufficient for this oxidation. The liquid which is finally left only contains environmentally compatible or degradable components, particularly alkali chlorides and, after an optional correction of the pH-value, fulfils the requirements for introduction into the waste water (pH 7 to 9).

With the process according to the invention gypsum is obtained in only a negligible quantity.

I claim:

1. Process for processing spent photographic baths from black and white film processing wherein said spent photographic baths include spent developing baths with a preponderant content of alkali sulphite and spent fixing baths with a preponderant content of thiosulphates, comprising recovering silver from the spent baths by electrodeposition, bringing the spent fixing baths to a pH of approximately 0.5 with concentrated HCl, separating elementary sulphur resulting from decomposition of the thiosulphates, and mixing a remaining sulphurous acid intermediate solution which remains in the spent fixing bath after elementary sulfur is removed with the spent developing baths, adjusting said spent developing baths to a pH of approximately 2, heating a resulting, $SO_2$-supersaturated solution in the spent developing baths, drawing off pure $SO_2$ in a vacuum, adjusting an $SO_2$-free residual solution remaining in the spent developing baths to a pH of approximately 10 with $Ca(OH)_2$ and drawing off liberated ammonia.

2. Process according to claim 1, characterized in that the residual solution free from $SO_2$ and $NH_4$ is mixed with $H_2O_2$ for oxidizing remaining organic and inorganic substances.

3. Process according to claim 1, wherein the alkali sulphite is sodium sulphite.

4. Process according to claim 1, wherein the thiosulphate is ammonium thiosulphate.

5. Process according to claim 1, wherein the thiosulphate is sodium thiosulphate.

* * * * *